United States Patent [19]

Jutras

[11] Patent Number: 5,430,907
[45] Date of Patent: Jul. 11, 1995

[54] WINDSHIELD WIPER ARM WITH ADJUSTABLE PRESSURE

[76] Inventor: Guy F. Jutras, 1505 Decelles Street, Apt. 10, St-Laurent, Québec, Canada, H4L 2E1

[21] Appl. No.: 331,943
[22] Filed: Oct. 31, 1994
[51] Int. Cl.⁶ .............................................. B60S 1/32
[52] U.S. Cl. ................................ 15/250.20; 15/250.35
[58] Field of Search ........... 15/250.20, 250.35, 250.34, 15/250.19, 250.31, 250.42, 250.30, 250.33

[56] References Cited

U.S. PATENT DOCUMENTS

| | | | |
|---|---|---|---|
| 2,156,505 | 5/1939 | Marcolivio | 15/250.20 |
| 2,752,626 | 7/1956 | Oishei | 15/250.20 |
| 2,782,450 | 2/1957 | Nesson | 15/250.35 |
| 2,799,039 | 7/1957 | Oishei | 15/250.35 |
| 3,366,989 | 2/1968 | Ludwig | 15/250.20 |
| 3,427,675 | 2/1969 | Tibbet | 15/250;35 |
| 4,777,695 | 10/1988 | Okuda et al. | 15/250.20 |

FOREIGN PATENT DOCUMENTS 20252  1/1988  Japan .................. 15/250.20

Primary Examiner—Gary K. Graham
Attorney, Agent, or Firm—Pierre Lesérance; Francois Martineau

[57] ABSTRACT

A specially designed turnbuckle is serially connected to a tension coil spring located in the recessed portion of a windshield wiper arm. Rotation of the turnbuckle allows to adjust the tension of the coil spring and therefore the force with which the wiper blade is pressed against the windshield surface.

7 Claims, 1 Drawing Sheet

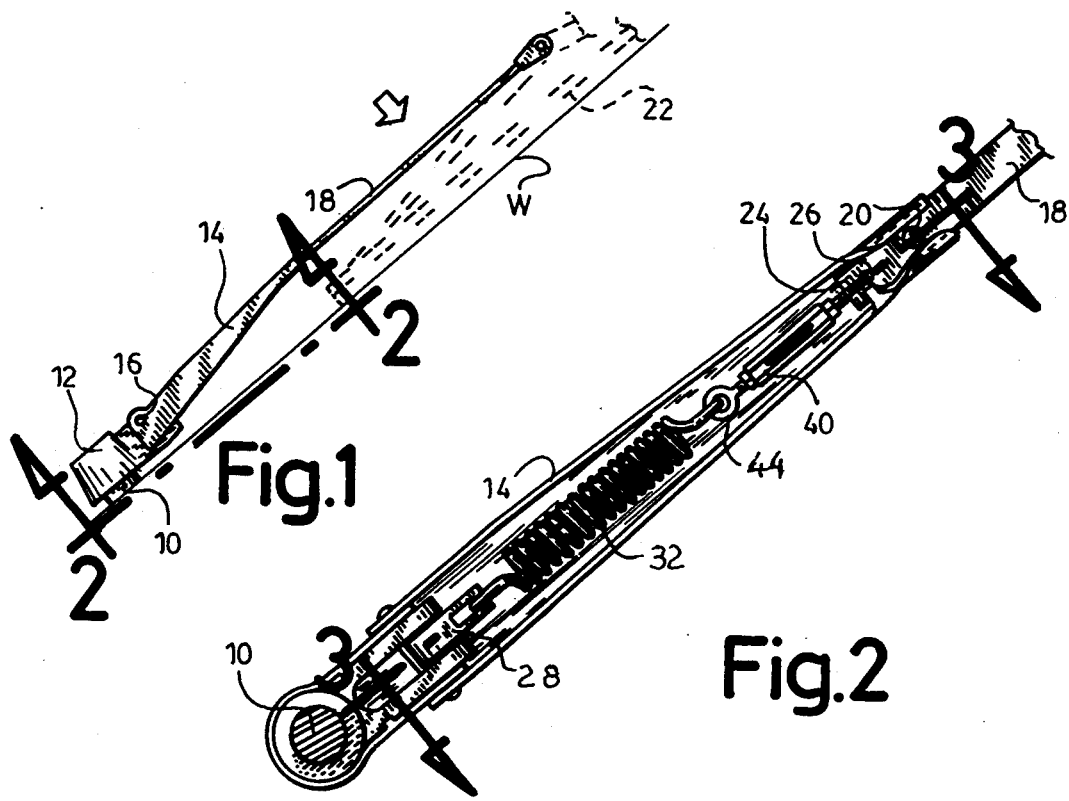
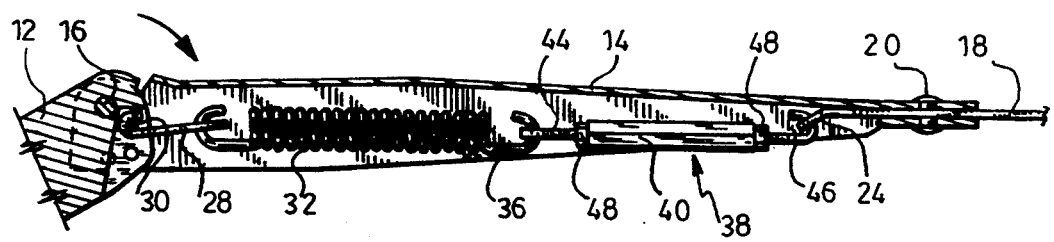
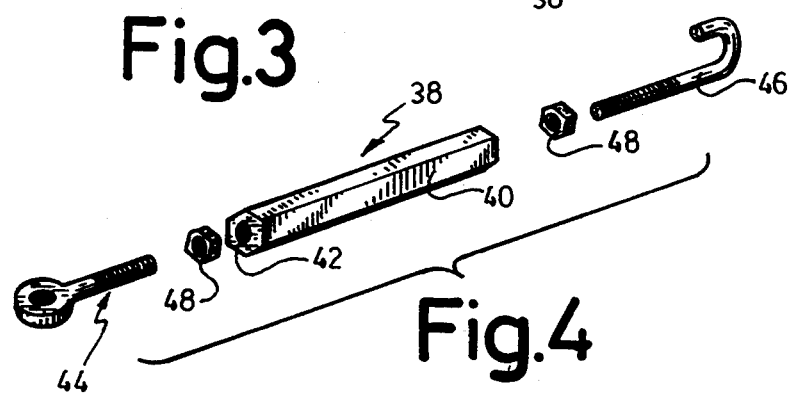

WINDSHIELD WIPER ARM WITH ADJUSTABLE PRESSURE

FIELD OF THE INVENTION

The present invention generally relates to windshield wipers for motor-vehicles and more particularly to a wiper assembly of the type in which the pressure exerted by the wiper blade on the windshield or rear window pane can be adjusted.

BACKGROUND OF THE INVENTION

It is known to provide a system to adjust the tensional force of the spring of a wiper assembly in order to adjustably vary the pressure exerted by the wiper blade on the window pane.

U.S. Pat. No. 3,366,989 to A. L. LUDWIG entitled WINDSHIELD WIPER ARMS and dated Feb. 6, 1968 describes such a system wherein the tension spring 25 is adjustably extended by a screw threaded tensioning rod 28 carrying an adjusting nut 29 which partially protrudes from a filler 18. Obviously, in this patent a specially designed filler 18 is required which is retained within the channel shaped portion 17 of the wiper arm by forming inturned flanges 21 along the inner edge of portion 17. It follows that the system in accordance with this patent cannot be used as a conversion kit for wiper assemblies already on the market and already in the hands of the automobile owners. Therefore, the latter would have to buy an entire new wiper assembly to obtain a wiper blade with an adjustable pressure capability.

OBJECTS OF THE INVENTION

It is therefore the general object of the present invention to provide motor vehicles with a simple device that improves the performance of actual windshield wipers by adding a specially designed turnbuckle serially attached to the existing tension coil spring so as to adjust and control the pressure exerted by the wiper blade on the windshield or rear window pane.

Another object of the present invention is to provide a device of the character described wherein adjusting of the elongation of the tension spring can be very easily effected with a standard tool and wherein the adjustment will retain its value once set.

Another object of the present invention is to provide a device of the character described of simple and inexpensive construction and which can be easily installed in series with existing conventional tension spring.

Another object of the invention is to provide automotive industry with a ready to install windshield wiper assembly of said type that improves performance, visibility and security on all motor vehicles.

SUMMARY OF THE INVENTION

In accordance with the invention, the wiper assembly comprises an arm head, a wiper arm swingably attached to the arm head and having a channel shaped portion, a wiper bar having an inner end fixed to the outer end of the wiper arm with an inner end portion extending within the channel shaped portion and spaced from the walls of the latter and having an aperture, a wiper blade carried by the outer end of the wiper bar, a tension coil spring located with a channel shaped portion of the wiper arm and terminated by first and second integral hook shaped portions, the first one of which is generally attached to the arm head either directly or by a link and a turnbuckle releasably linking the second hook. shaped portion of the spring to the wiper bar by means of said aperture, the turnbuckle including an elongated body with an axial throughbore having right hand and left hand threaded end portions, and two bolts threaded within the turnbuckle body. As an alternative, the turnbuckle can be serially attached to the arm head and to the first hook shaped portion of the spring while the second hook shaped portion is inserted within the wiper bar aperture.

Preferably, one bolt is an eye bolt for releasably receiving one of said hook shaped portions of the spring and the other bolt a J-bolt having a free hook removably inserted within the wiper bar aperture or attached to the arm head. Rotation of the body of the turnbuckle causes elongation or contraction of the tension spring to adjustably vary the pressure exerted by the wiper blade against a windshield or the like window pane.

Preferably, the body has an hexagonal cross-section for rotation by a conventional and easily available open end spanner.

Preferably, lock nuts are threaded on the J-bolt and on the eye bolt and tightened against the end faces of the turnbuckle body to positively lock the body in its adjusted rotated position to therefore set the adjusted tensional force of the spring.

Alternately, one end of the spring can be threaded to form a bolt which replaces the eye bolt.

BRIEF DESCRIPTION OF THE ANNEXED DRAWINGS

FIG. 1 is a side elevation of the wiper assembly of the invention;

FIG. 2 is a plan view, partly in cross-section, taken along line 2—2 of FIG. 1;

FIG. 3 is a longitudinal section taken along line 3—3 of FIG. 2; and

FIG. 4 is an exploded perspective view of the elements forming the turnbuckle used in the assembly of the invention.

DETAILED DESCRIPTION OF THE PREFERRED EMBODIMENT

The wiper assembly in accordance with the present invention usually comprises the following conventional parts:

a wiper pivot 10 adapted to be driven a wiper motor (not shown);

an arm head 12 removably fitted over the wiper pivot 10 for rotation thereby in a plane generally parallel to the windshield W or the like window pane, for instance in the rear window of a motor vehicle.

The wiper assembly further includes an elongated wiper arm 14 having generally a channel shaped cross-section. The inner end of the wiper arm 14 is pivotally connected by a pin 16 to the arm head 12 for pivotal movement of the wiper arm towards and away from the windshield W. A wiper bar 18 is generally secured by a rivet 20 to the outer end of the wiper arm 14. The outer end of the wiper bar 18 pivotally carries in conventional manner a wiper blade 22, shown in dotted lines, which is pressed against the windshield W and is swept back and forth by the wiper pivot 10. The wiper bar 18 has an inner end portion 24 which has an aperture 26.

The conventional wiper assembly may or may not include a link 28 which is pivotally attached to the arm head 12 by means of a retaining pin 30 which is radially inwardly offset with respect to the pivot pin 16.

The tension spring normally used to press the wiper blade 22 against the windshield W includes two hook portions, one at each end, the inner end being directly attached to the retaining pin 30, or by means of the link 28 and the outer end being directly engaged into the aperture 26 of the wiper bar 18.

In accordance with the invention, the outer end of this tension coil spring 36 is disconnected from the aperture 26, the inner end portion of original wiper bar 18 is then shortened to allow enough room for a specially designed turnbuckle 38 to be serially mounted in between the outer hook 36 of the existing spring 32 and the new aperture 26 of the wiper bar 18. Generally, the wiper bar 18 is shortened the same length as the overall dimension of the turnbuckle 38 with both its bolts in their extended status.

The turnbuckle 38 includes an elongated body 40 having preferably an external hexagonal cross-sectional shape. The body 40 has a throughbore forming two inwardly threaded end portions 42, the threads being one right hand thread and one left hand thread. An eye-bolt 44 has its threaded portion screwed within one threaded portion 42 of elongated body 40 while a J-bolt 46 is screwed within the opposite threaded portion 42 of body 40.

Optionally, lock nuts 48 are previously screwed on the eye bolts 44 and J-bolts 46 before the latter are screwed within the body 40. The lock nuts are designed to be tightened against the end faces of body 40. The turnbuckle 38, once assembled, is attached to the outer hook portion 36 of coil spring 32 by the eye bolt 44 while the J-bolt 46 has its hook releasably inserted within the aperture 26 of the wiper bar 18.

The inner end portion 24 of wiper bar 18 is bent away from the outer wall of the channel shaped wiper arm 14 so as to provide sufficient space for easy insertion of the J-bolt 46 into the aperture 26. The turnbuckle 38 must be small enough to easily fit within the channel shaped wiper arm 14 with sufficient space between the side walls of the wiper arms and the body 40 of the turnbuckle for insertion of a conventional open end spanner to rotate the turnbuckle body in order to cause elongation or contraction of the coil spring and thus adjust its tension to obtain the optimal wiper blade pressure on windshield W.

Once the desired pressure has been obtained, the lock nuts 48 are tightened against the end faces of body 40 again by the use of a conventional open end spanner.

Preferably, the external diameters of the lock nuts 48 will be the same as that of the elongated body 40 so the user can use the same open end spanner to rotate body 40 and the lock nuts 48.

Turnbuckle 38 should be small enough to be easily inserted and installed within the cross-sectional shape of the conventional wiper arm 44, be sufficiently resistant to the tension exerted thereon by the tension spring 32 and fit the latter and aperture 26.

Obviously, all the parts of the turnbuckle assembly 38 must be made of a corrosion-proof material or of material properly coated with a corrosion resistant layer. The turnbuckle assembly 38 is resistant to water and ice infiltration.

The combination of the coils spring 32 and turnbuckle 38 is completely concealed within the wiper arm 14 and does not detract from the aesthetic aspect of the wiper assembly.

The wiper arm 14 can be pivoted outwardly from the windshield and maintained away from the windshield due to the offset position of the retaining pin 30 as in conventional wiper assemblies.

If desired, turnbuckle assembly 38 can be installed between arm head 12 and spring 32 or between two springs which would then be shorter than spring 32. In a less preferred embodiment, eye bolt 44 can be eliminated and spring 32 modified so that its hook portion 36 straightened out and threaded to be screwed in body 40. An already installed conventional wiper assembly can be modified in accordance with the invention without the use of any special tools and the conversion can be effected either by the car owner or by any garage mechanic.

The wiper blade pressure can thus be easily adjusted to overcome the turbulence effected by the wind onto the wiper blade and which normally reduces its pressure on the windshield. Naturally, this depends on the vehicle speed. Tests have shown that the pressure of the wiper blade on the windshield can be increased to an ideal value of about 1200 grams without affecting the wiper motor whereas the wiper blade pressure in conventional wiper assemblies as they come from the car manufacturer normally do not exceed 900 grams. The wiper blade pressure often varies from one vehicle to the next and also in accordance with the age of the vehicle.

It is therefore very advantageous not only to provide a conversion device which increases the pressure exerted by the wiper blade to, as close as possible, the above value of 1200 grams, but which can vary the extension of the coil spring to obtain this value depending on the initial value of the wiper assembly which is being converted.

I claim:

1. A wiper assembly comprising an arm head, an elongated wiper arm having an inner end and an outer end, said inner end swingably attached to said arm head, said wiper arm having a channel shaped portion defining a channel therein, an elongated wiper bar having an inner and an outer end, said inner end of said wiper bar fixed to the outer end of said wiper arm and having an inner end portion which lies in said channel and is spaced from the walls of said channel, said inner end portion of said wiper bar having an aperture therethrough;

a wiper blade carried by the said outer end of said wiper bar;

a tension coil spring located within said channel of said wiper arm and terminated by first and second, integral hook-shaped portions; and a turnbuckle serially releasably connected to one of said hook shaped portions of said spring, said turnbuckle and said spring together forming an elongated unit, said unit removably attached between and to said arm head and said wiper bar aperture to press the blade against a windshield, said turnbuckle including an elongated body defining end faces with an axial throughbore having a right hand and a left hand threaded portion, and a threaded member received in each said threaded portion such that rotation of said body causes elongation or contraction of said spring to thereby adjust its tensional force and consequently to control adjustment of the pressure exerted by said wiper blade against said windshield.

2. A wiper assembly as defined in claim 1, wherein said threaded members comprise a pair of bolts screwed within the respective threaded portions of said body.

3. A wiper assembly as defined in claim 2, wherein one of said bolts is a J-bolt having an open hook and the other one of said bolts is an eye-bolt having an eye-portion.

4. A wiper assembly as defined in claim 1, wherein said body has an hexagonal transverse cross-section for rotation by an open end spanner.

5. A wiper assembly as defined in claim 4, further including lock nuts threaded on said bolts and tightened against the end faces of said body and rotatable by an open end spanner.

6. A wiper assembly as defined in claim 4, wherein one of said bolts is J-bolt having an open hook and the other one of said bolts is an eye-bolt having an eye-portion.

7. A wiper assembly as defined in claim 1, wherein said turnbuckle is made of corrosion resistant material.

* * * * *